(12) United States Patent
Dang et al.

(10) Patent No.: US 11,102,566 B2
(45) Date of Patent: Aug. 24, 2021

(54) CAPACITIVE WIRELESS CHARGING FOR WIRELESS EARBUDS

(71) Applicant: Apple Inc., Cupertino, CA (US)

(72) Inventors: Zhigang Dang, Sunnyvale, CA (US); Michael B. Nussbaum, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/930,033

(22) Filed: Jul. 15, 2020

(65) Prior Publication Data

US 2020/0351580 A1 Nov. 5, 2020

Related U.S. Application Data

(62) Division of application No. 16/114,148, filed on Aug. 27, 2018, now Pat. No. 10,750,268.

(51) Int. Cl.
| | |
|---|---|
| *H04R 1/10* | (2006.01) |
| *H02J 50/05* | (2016.01) |
| *H04R 1/02* | (2006.01) |
| *H02J 7/00* | (2006.01) |

(52) U.S. Cl.
CPC ............. *H04R 1/1025* (2013.01); *H02J 7/00* (2013.01); *H02J 50/05* (2016.02); *H04R 1/028* (2013.01); *H04R 1/1016* (2013.01)

(58) Field of Classification Search
CPC .... H04R 1/1025; H04R 1/028; H04R 1/1016; H02J 50/05; H02J 7/00; H02J 7/025
USPC ....................................................... 381/334
See application file for complete search history.

(56) References Cited

U.S. PATENT DOCUMENTS

| | | | |
|---|---|---|---|
| 5,656,923 A | * | 8/1997 | Schultz ............... H02J 50/80 323/207 |
| 8,180,093 B2 | | 5/2012 | Hankey et al. |
| 8,185,084 B2 | | 5/2012 | Terlizzi |
| 8,311,255 B2 | | 11/2012 | Hankey et al. |
| 8,401,219 B2 | | 3/2013 | Hankey et al. |
| 8,650,925 B2 | | 2/2014 | Hankey et al. |
| 8,712,071 B2 | | 4/2014 | Terlizzi et al. |
| 8,867,758 B2 | | 10/2014 | Terlizzi et al. |

(Continued)

FOREIGN PATENT DOCUMENTS

JP 5798471 10/2015

OTHER PUBLICATIONS

Notice of Allowance issued in U.S. Appl. No. 16/114,148, dated Apr. 21, 2020 in 10 pages (of-record in parent application).

*Primary Examiner* — Sean H Nguyen
(74) *Attorney, Agent, or Firm* — Kilpatrick Townsend & Stockton LLP

(57) ABSTRACT

A case for a pair of earbuds including a housing having first and second cavities formed within the housing, the first cavity configured to receive a first earbud in the pair of earbuds and the second cavity configured to receive a second earbud in the pair of earbuds; a lid attached to the housing; a first pair of electrodes positioned within the housing adjacent to the first cavity; a second pair of electrodes positioned within the housing adjacent to the second cavity; and charging circuitry coupled to the first and second pairs of electrodes, the charging circuitry including a high frequency inverter configured to receive a DC power signal and output a high frequency AC signal to each of the first and second pairs of electrodes.

17 Claims, 11 Drawing Sheets

(56) References Cited

U.S. PATENT DOCUMENTS

| | | |
|---|---|---|
| 9,118,990 B2 | 8/2015 | Hankey et al. |
| 9,246,553 B2 | 1/2016 | Ichikawa et al. |
| 9,287,657 B2 | 3/2016 | Hankey et al. |
| 9,294,830 B2 | 3/2016 | Terlizzi |
| 9,343,909 B2 | 5/2016 | Tsuda et al. |
| 9,462,109 B1 | 10/2016 | Frazier Fields et al. |
| 9,516,401 B2 | 12/2016 | McCarthy et al. |
| 9,755,435 B2 | 9/2017 | Sempel et al. |
| 9,769,558 B2 | 9/2017 | Chandramohan et al. |
| 9,854,343 B2 | 12/2017 | Hankey et al. |
| 9,949,015 B1 | 4/2018 | Minoo et al. |
| 9,961,431 B2 | 5/2018 | McPeak et al. |
| 9,967,644 B2 | 5/2018 | Chawan et al. |
| 9,967,646 B2 | 5/2018 | Hankey et al. |
| 9,967,648 B2 | 5/2018 | Panecki et al. |
| 9,967,649 B2 | 5/2018 | Chandramohan et al. |
| 9,967,650 B2 | 5/2018 | Chawan et al. |
| 9,973,840 B2 | 5/2018 | Wagman et al. |
| 9,973,845 B2 | 5/2018 | Chawan et al. |
| 10,003,880 B2 | 6/2018 | Wagman et al. |
| 10,003,881 B2 | 6/2018 | Cousins et al. |
| 10,009,678 B2 | 6/2018 | Panecki et al. |
| 10,097,913 B2 | 10/2018 | Zorkendorfer et al. |
| 10,165,346 B2 | 12/2018 | Hankey et al. |
| 10,182,282 B2 | 1/2019 | McPeak et al. |
| 10,206,474 B2 | 2/2019 | Brzezinski et al. |
| 10,212,506 B2 | 2/2019 | Panecki et al. |
| 10,225,637 B2 | 3/2019 | Panecki et al. |
| 10,313,775 B2 | 6/2019 | Hankey et al. |
| 10,390,594 B2 | 8/2019 | Brzezinski et al. |
| 10,397,682 B2 | 8/2019 | Chawan et al. |
| 10,397,683 B2 | 8/2019 | LeBlanc et al. |
| 10,433,043 B2 | 10/2019 | Hankey et al. |
| 10,516,931 B2 | 12/2019 | Hankey et al. |
| 10,631,609 B2 | 4/2020 | Brzezinski et al. |
| 10,681,446 B2 | 6/2020 | Chawan et al. |
| 2008/0170733 A1 | 7/2008 | Reithinger |
| 2016/0073189 A1 | 3/2016 | Linden et al. |
| 2017/0093079 A1 | 3/2017 | Wagman et al. |
| 2017/0238087 A1 | 8/2017 | Chawan et al. |
| 2018/0064224 A1 | 3/2018 | Brzezinski et al. |

* cited by examiner

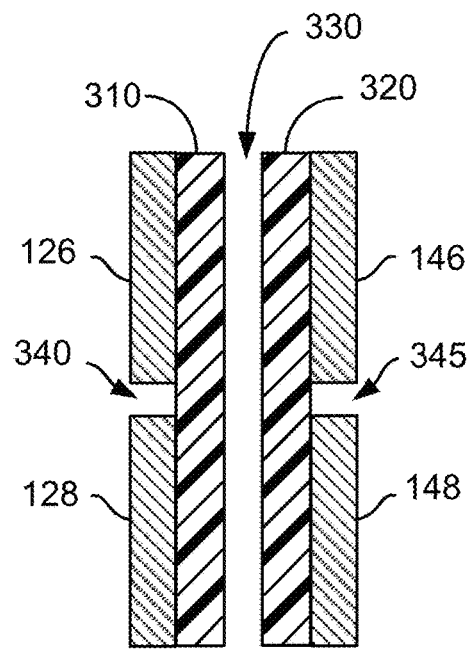
FIG. 3B
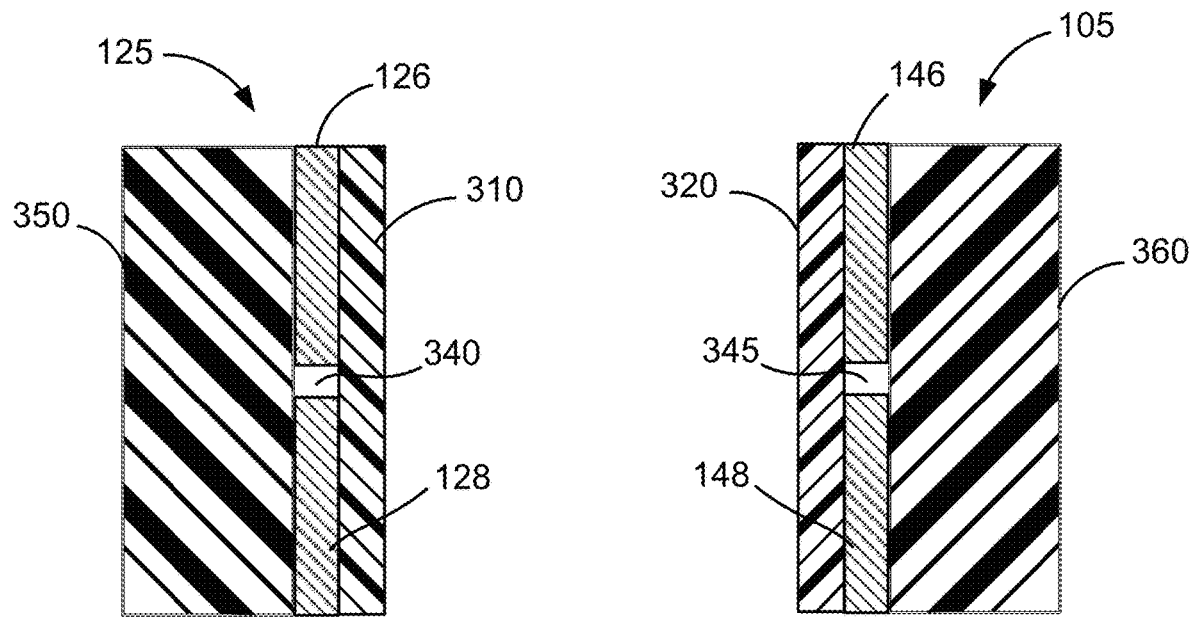
FIG. 3C
FIG. 3D

CAPACITIVE WIRELESS CHARGING FOR WIRELESS EARBUDS

CROSS REFERENCE TO RELATED APPLICATIONS

This application is a divisional of U.S. application Ser. No. 16/114,148 filed Aug. 27, 2018, and entitled "Capacitive Wireless Charging For Wireless Earbuds", the entire contents of which are incorporated herein by reference for all purposes.

BACKGROUND OF THE INVENTION

The described embodiments relate generally to portable listening devices such as earbuds and other types of in-ear listening devices, and to cases for storing and charging such devices.

Portable listening devices can be used with a wide variety of electronic devices such as portable media players, smart phones, tablet computers, laptop computers and stereo systems among others. Portable listening devices have historically included one or more small speakers configured to be place on, in, or near a user's ear, structural components that hold the speakers in place, and a cable that electrically connects the portable listening device to an audio source. Other portable listening devices can be wireless devices that do not include a cable and instead, wirelessly receive a stream of audio data from a wireless audio source.

While wireless portable listening devices have many advantages over wired devices, they also have some potential drawbacks. For example, wireless portable listening devices, typically require a battery, such as a rechargeable battery, that provides power to the wireless communication circuitry and other components of the device. For many currently available wireless portable listening devices, charge can be restored to the rechargeable battery in the device by physically connecting the portable listening device to a power source, which typically requires that the wireless portable listening device have a pair of electrical contacts to receive the charge.

In many devices such electrical contacts are positioned within a receptacle connector in the wireless portable listening device. The receptacle connector typically includes a cavity in the wireless portable listening device that provides an avenue within which dust and moisture can intrude and damage the device. Furthermore, a user of the electronic device has to physically connect the charging cable to the receptacle in order to charge the battery. Some other wireless portable listening devices including charging contacts at an external surface of the device, which is a significant improvement with respect to moisture resistance and other potential problems as compared to internal contacts positioned within a receptacle connector cavity. Even external contacts, however, can still result in potential paths for moisture ingression under extreme conditions (for example, at the seams between the contacts and housing) and/or potential corrosion of the contacts when repeatedly exposed to corrosive liquids, such as sweat.

BRIEF SUMMARY OF THE INVENTION

Some embodiments of the present disclosure pertain to a case that can store and wirelessly charge an in-ear listening device, such as a pair of earbuds. The case can include one or more cavities to hold the in-ear listening device and charging circuitry to provide power to a rechargeable battery within the listening device (or within each of the pair of earbuds).

Other embodiments pertain to a pair of earbuds or other type of in-ear listening device that can be wirelessly charged by a case according to the present disclosure.

In some embodiments, a case for a portable listening device, such as a pair of earbuds is provided. The case can include a housing having first and second cavities formed within the housing along with a first pair of electrodes positioned within the housing adjacent to the first cavity and a second pair of electrodes positioned within the housing adjacent to the second cavity. The first cavity is configured to receive a first earbud in the pair of earbuds and the second cavity is configured to receive a second earbud in the pair of earbuds. A lid can be attached to the housing and the case includes charging circuitry coupled to the first and second pairs of electrodes that includes a high frequency inverter configured to receive a DC power signal and output a high frequency AC signal to each of the first and second pairs of electrodes enabling the case to charge the pair of earbuds.

In some embodiments an earbud is provided that includes a housing including a speaker housing portion having an audio exit and a stem housing extending away from the speaker portion; a speaker disposed in the speaker housing portion and operatively coupled to emit sound through the audio exit; a pair of electrodes, including a first electrode formed around a first portion of the stem housing and a second electrode, spaced apart from the first electrode and formed over a second portion of the stem housing; a wireless antenna and circuitry coupled to receive a wireless signal over the antenna; a battery; and charging circuitry coupled between the battery and the pair of electrodes where the charging circuitry is configured to charge the battery from capacitive power received over the pair of electrodes.

Some embodiments pertain to a case for a pair of earbuds that includes a conformable electrode in the lid of the case. The case can include a housing having first and second cavities formed within the housing where the first cavity is configured to receive a first earbud in the pair of earbuds and the second cavity is configured to receive a second earbud in the pair of earbuds. A lid operable between a closed position where the lid is aligned over the first and second cavities and an open position where first and second cavities are exposed enabling the pair of earbuds to be removed from the housing can be attached to the housing, and the lid can include an electrically conductive and compliant region facing the first and second cavities when the lid is in the closed position. Charging circuitry can coupled to each of the first and second pairs of electrodes. In some embodiments the charging includes a high frequency inverter configured to receive a DC power signal and output a high frequency AC signal to each of the first and second pairs of electrodes.

Some embodiments pertain to an earbud that includes electrodes in a speaker housing portion. The earbud can include a housing having a speaker housing portion with an audio exit and a stem housing extending away from the speaker portion. A speaker operatively coupled to emit sound through the audio exit can be disposed in the speaker housing portion along with a pair of electrodes, including a first electrode and a second electrode. The earbud can further include a battery; a wireless antenna and circuitry coupled to receive a wireless signal over the antenna; and charging circuitry coupled between the battery and the pair of electrodes. The charging circuitry configured to charge the battery from power received capacitively over the pair of electrodes.

In some embodiments an audio system is provided that includes both a case and a pair of earbuds, or other portable listening device, as disclosed herein.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

FIG. 3B is a simplified cross-sectional view of a portion of FIG. 3A;

FIGS. 3C and 3D are simplified cross-sectional views of a portion of an earbud 125 and earbud case, respectively, according to embodiments of the disclosure;

DETAILED DESCRIPTION OF THE INVENTION

Some embodiments of the present disclosure pertain to a case that can store and wirelessly charge an in-ear listening device, such as a pair of earbuds. Other embodiments of the disclosure pertain to a pair of earbuds or other type of in-ear listening device that can be wirelessly charged by a case according to the present disclosure.

Figure 1:
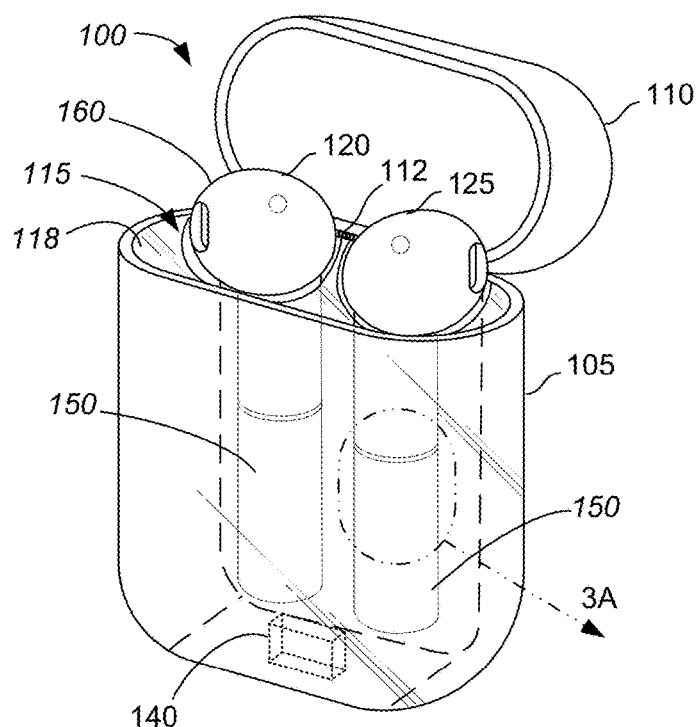
FIG. 1 illustrates a simplified perspective view of an earbud case according to some embodiments of the disclosure.
Figure 2:
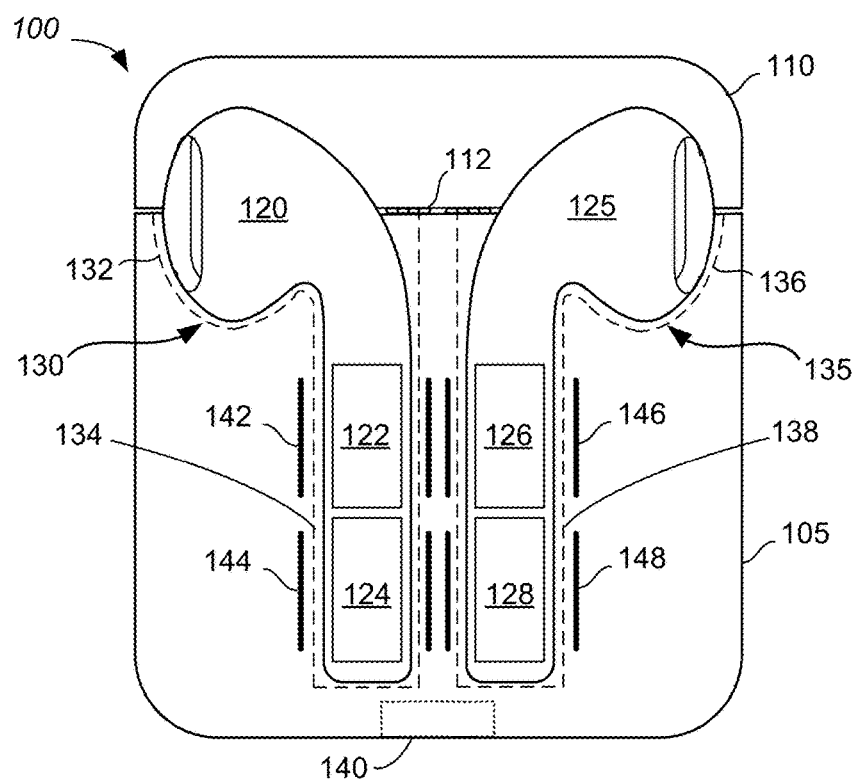
FIG. 2 is a simplified cross-sectional view of the earbud case shown in FIG. 1.

In order to better understand and appreciate various embodiments and aspects of the present invention, reference is first made to FIGS. 1 and 2. FIG. 1 illustrates a simplified see-through perspective view of an earbud case 100 according to some embodiments of the disclosure, and FIG. 2 is a simplified cross-sectional view of earbud case 100. As shown in the figures, earbud case 100 includes a housing 105 and a lid 110 that can be pivotally coupled to housing 105 by a hinge 112. Housing 105 can include interior space in which a pair of earbuds 120, 125 can be stored.

The interior space of housing 105 can define first and second cavities 130, 135 (shown in FIG. 2) sized and shaped to accept earbuds 120, 125, respectively. In some embodiments, an insert 115 can bonded to and considered a portion of housing 105 to form cavities 130, 135. Each of the cavities 130, 135 can then be defined by a surface of the insert 115 that conforms to the general shape of earbuds 120, 125. For example, insert 115 can define a top surface 118 of housing 105 that includes upper indentations 132, 136 that are part of cavities 130, 135 and that accept the speaker portions of each earbud. Insert 115 can further include first and second interior tubes 134, 138 that extend from cavities 130, 135, respectively, and accept stems 150 of each earbud.

Lid 110 can be coupled to housing 105 by a hinge 112 or similar mechanism that enables the lid to be moved between a closed position in which the lid covers the interior space of case 100 including cavities 130, 135 and an open position (illustrated in FIG. 1) in which the cavities are exposed to allow a user to place the earbuds 120, 125 within case 100 or remove the earbuds 120, 125 from the case. While not shown in FIG. 1 or 2, earbud case 100 can include a battery, charging circuitry to charge the battery and/or charge earbuds 120, 125 stored within the case, and other circuitry and components, some of which are discussed with respect to FIG. 6. In some embodiments, each of the earbud housing 105, lid 110 and insert 115 can be made from a plastic or similar material such as ABS or polycarbonate. Similarly, each earbud 120, 125 can include an earbud housing that defines the size and shape of the earbud and can also be made out of a plastic or similar material, including but not limited to ABS or a polycarbonate. In some embodiments, the housing for each earbud 120, 125 can include a speaker housing portion and a stem portion that is coupled to and extends away from the speaker housing portion. Speaker housing portion can include an audio exit and a speaker operatively coupled to emit sound through the audio exit. Stem portion can include a battery, wireless antenna, circuitry coupled to receive a wireless signal over the antenna, charging circuitry and other components. Embodiments of the invention are not limited to any particular configuration of components within earbuds 120, 125, however.

Case 100 can also include a receptacle connector 140 that has an opening at an exterior surface of case 100 (e.g., the bottom surface as shown in FIG. 1). A suitable plug connector can be inserted in the opening to mate with the receptacle connector and transfer power to case 100 (e.g., from a charging cable) to charge a battery (not shown) within case 100 and/or to transfer data between case 100 and another device. Receptacle connector 140 can be, for example, a mini-USB connector, a Lightning connector developed by Apple Inc., the assignee of the present application, a USB-C connector, or any other appropriate connector. In other embodiments, connector 140 is optional and case 100 can instead receive power to charge an internal battery from a wireless power source. For example, in some embodiments case 100 can include one or more wireless power receiving coils that can wirelessly receive power from one or more wireless power transmit coils within a wireless charging mat or similar device.

According to embodiments of the disclosure, earbud case 100 can wirelessly charge each of the earbuds 120, 125. Earbuds 120, 125 are relatively small devices that include various electronics and audio components as described below with respect to FIG. 6 to maximize a user's experience using earbuds 120, 125. Thus, in some embodiments there is very limited space available for such wireless charging circuitry and the inventors have found that capacitive coupling is more space efficient than inductive coupling in such a constrained environment. Towards this end, in some embodiments, earbud case 100 can include multiple capacitive plates that are positioned within the case to align with electrodes in each respective earbud 120, 125.

For example, as shown in FIGS. 1 and 2, each earbud 120, 125 can include an elongated stem 150 that extends away from the ear portion 160 of the bud, which in some embodiments can include the microphone, battery, antenna and other components of the earbud. Each earbud 120, 125 can include a pair of electrodes embedded within the stem. For example, as shown in FIG. 2, earbud 120 can includes electrodes 122 and 124, while earbud 125 can include electrodes 126 and 128.

Earbud case 100 can include electrodes embedded within the case at locations adjacent to the earbud electrodes 122, 124 and 126, 128 when the earbuds are fully inserted into cavities 130, 135. For example, as shown in FIG. 2, earbud case 100 can include electrodes 142 and 144 disposed adjacent to electrodes 122 and 124, respectively, in earbud 120 when earbud 120 is fully inserted into cavity 130. Similarly, earbud case 100 can also include electrodes 146 and 148 disposed adjacent to electrodes 126 and 128, respectively, in earbud 125 when earbud 125 is fully inserted into cavity 135.

To maximize power transfer between electrodes in each of the earbuds 120, 125 and corresponding electrodes in case 100, embodiments of the invention minimize the distance between the electrodes in the earbuds and the electrodes in the case as described below. In some embodiments earbud electrodes 122, 124 and 126, 128 conform in shape to the earbud housing portion of each earbud stem 150. For example, if stems 150 have a cylindrical cross-section, each of the earbud electrodes 122, 124 and 126, 128 can have a similar cylindrical cross-section. If stems 150 have an oval or other cross-sectional shape, each of the earbud electrodes can have a matching cross-sectional shape.

Similarly, the electrodes 142, 144, 146 and 148 within case 100 can conform to the shape of cavities 130, 135 in the area in which the electrodes are positioned. In some embodiments the cross-section of the portion of each cavity 130, 135 that accepts the earbud stem 150 generally matches the cross-section of stem 150 and thus, when earbud stems 150 have a cylindrical cross-sectional shape, case electrodes 142, 144, 146 and 148 can also have a cylindrical cross-section with each case electrode annularly surrounding its respective earbud electrode. When stems have an oval or other cross-sectional shape, the case electrodes can have a matching cross-sectional shape as well. Further details of electrodes within earbud case 100 and earbuds 120, 125 are discussed below with respect to FIGS. 3A-3D, 4 and 5.

Figure 3A:
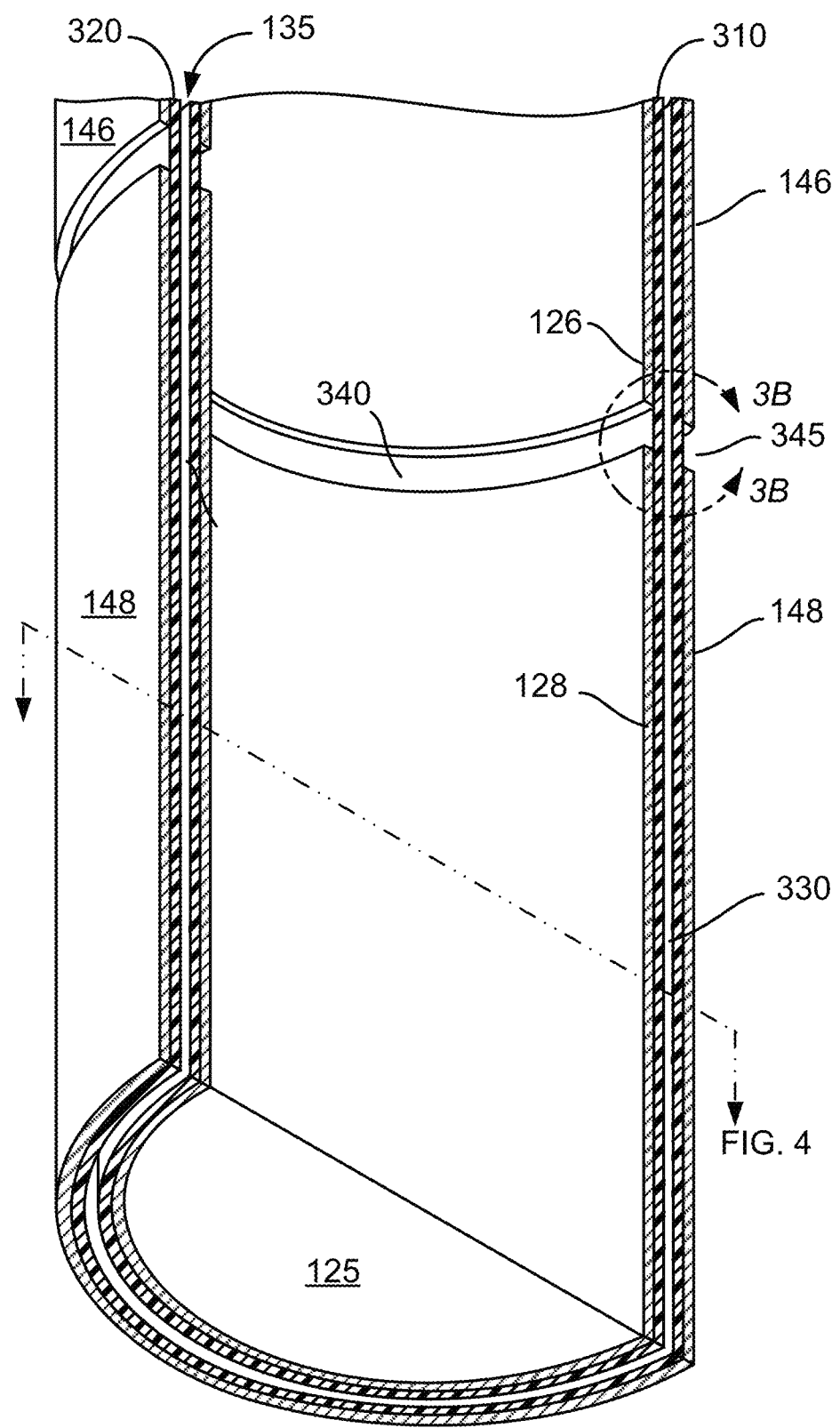
FIG. 3A is a simplified cut-away perspective view of one of the earbuds shown in FIG. 1 and a portion of the earbud case surrounding the depicted earbud.

FIG. 3A is a simplified exploded perspective cut-away view of a portion of cavity 135 in the earbud case and of earbud 125 shown in FIG. 1, and FIG. 3B is an exploded side plan cross-sectional view of a portion of the earbud cavity 135 and 125 shown in FIG. 3B. In order to more clearly illustrate concepts of embodiments of the invention, neither of FIG. 3A or 3B are drawn to scale and neither of FIG. 3A or 3B depict the housing of the earbuds or earbud case. For example, as discussed above, earbud 125 can include an earbud housing made from a plastic such as ABS or a polycarbonate or any suitable material. The housing provides the earbud with structure and forms a cavity in which the various components of the earbud (e.g., circuitry, speakers, etc.) are disposed. The earbud housing will have a certain thickness to it that provides desired structure and sufficient rigidity to the earbud. Similarly, housing 105 provides structure to case 100 and defines internal sections of the case in which its electrical components are housed. Housing 105 also includes surfaces (e.g., via insert 115) that define cavities 130, 135. The various surfaces of housing 105 and the earbud housing are not depicted in FIGS. 3A and 3B and are instead discussed with respect to FIGS. 3C and 3D.

As shown in FIGS. 3A and 3B, earbud 125 can include first and second electrodes 126, 128 that are separated by a gap 340. Each of the electrodes 126, 128 can have a cylindrical cross-sectional shape (as shown in FIG. 3A) that conforms to the shape of the stem 150 of earbud 125. In some embodiments gap 340 can be an air gap and in other embodiments, gap 340 can be filled with an appropriate electrically insulating material. Similarly, electrodes 146, 148 within the earbud case can be separated from each other by a gap 345 and have a cross-sectional shape that matches (albeit with a slightly larger radius) that of electrodes 126, 128. Gap 345 can be an air gap or can be filled with an electrically insulating material similar to gap 340.

When earbud 125 is fully inserted within cavity 135 (i.e., in a "charging position"), the earbud electrodes 126, 128 align with earbud case electrodes 146, 148 forming a first capacitor between electrodes 126, 146 and a second capacitor between electrodes 128, 148. The two capacitors can form part of an electric circuit as discussed below with respect to FIG. 6, enabling power to be transferred from the earbud case to the earbud. The amount of power that can be transferred depends, among other factors, on the distance between the two electrodes in each capacitor. A tighter spacing between the electrodes results in more efficient power transfer.

In the charging position, electrodes 126 and 128 are separated from, electrodes 146, 148 of case 100 by an air gap 330. Earbuds 120 and 125 and cavities 130, 135 can be manufactured so that, while allowing for manufacturing tolerances, the air gap 330 between adjacent electrodes is minimized when the earbuds are in the charging position in order to decrease the distance between each of the electrode pairs while still allowing the earbud to be placed within cavity 135. In some embodiments the earbuds and case are manufactured to tolerances that provide an air gap of between 5-20 microns.

Various embodiments of the disclosure include one or more additional design features that further minimize and/or control the space between the adjacent electrodes in each of the two capacitors. One such additional design feature includes minimizing the thickness of a very thin dielectric skin formed over the electrodes on the exterior surface of the earbud, the interior surface of the earbud receiving cavity or both. For example, in the embodiment shown in FIGS. 3A and 3B, earbud 125 can include a thin dielectric layer 310 over electrodes 126 and 128 while receiving cavity 135 can include a thin dielectric layer 320 over electrodes 146, 148. Another such design feature includes a certain amount of draft within the stem portion of each earbud receiving cylinder 134, 138 as discussed below with respect to FIG. 7.

In some embodiments, each of the dielectric skins 310 and 320 can be a thin electrically insulating material that can be, for example, selected for cosmetic reasons. Examples of suitable dielectric skins are various polymer materials. In other embodiments, each of the dielectric skins 310 and 320 can be a high dielectric constant material, such as a high dielectric constant polymer, ceramic or other material with a dielectric constant of greater than 5 that enables increased capacitance and thus improved charging capacity. While embodiments of the disclosure are not limited to any particular thickness for layers 310 or 310, in some embodiments either or both of layers 310 and 320 are between 5-25 microns thick, and in some embodiments either or both of layers 310 and 320 are between 5-10 microns thick. Each of layers 310 and 320 can be formed over electrodes 126, 146, respectively, with an overmolding process or other appropriate techniques.

Figure 4:
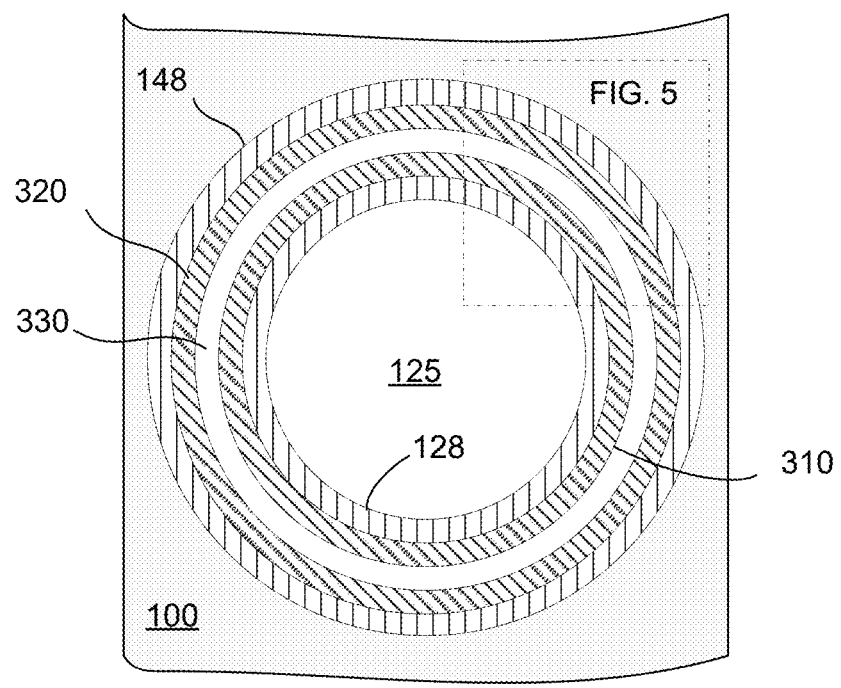
FIG. 4 is a simplified cross-sectional view of one of the earbuds and a portion of the earbud case shown in FIG. 3A.
Figure 5:
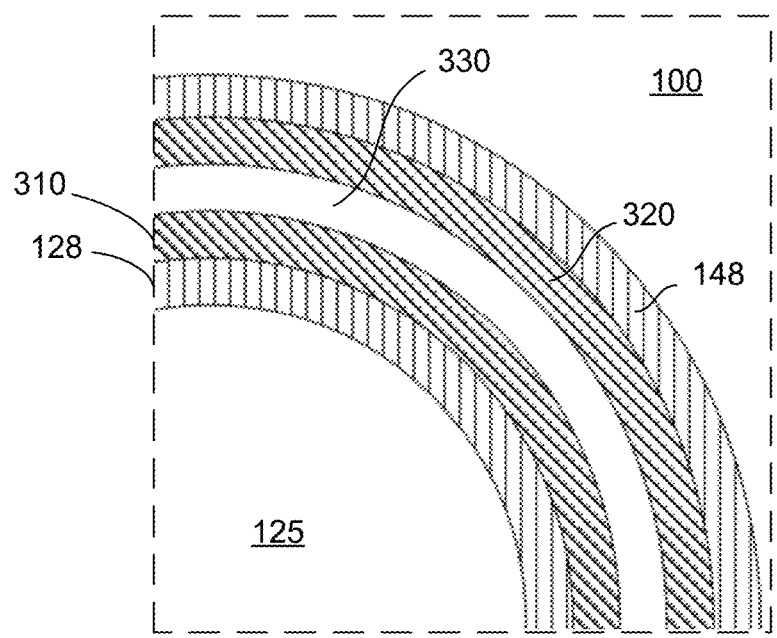
FIG. 5 is an enlarged diagram of a portion of the earbud and earbud case shown in FIG. 4.

FIGS. 4 and 5 are illustrations that further depict the relationship between adjacent electrodes 128 and 148 when earbud 125 is fully inserted within its cavity 135 according to some embodiments. Specifically, FIG. 4 is a simplified cross-sectional view taken along the lines shown in FIG. 3A of electrodes 128, 148 and FIG. 5 is an exploded view of a portion shown in FIG. 4. As shown in FIGS. 4 and 5, the distance between adjacent electrodes 128, 148 is determined by the thickness of dielectric layers 310 and 320 as well as gap 330. For ease of illustration, the housings of earbud 125 and case 100 are not depicted in either of FIG. 4 or 5 just as the housings are not depicted in FIG. 3A or 3B.

As discussed above, in some embodiments each of the earbuds and the earbud case include a housing that is not shown in FIG. 3A or 3B. For example, as shown in FIG. 3C, which is a simplified cross-sectional view of a portion of earbud 125, electrodes 126, 128 can be formed over a housing 350. Housing 350 can be made from an plastic such as ABS or a polycarbonate or another suitable electrically insulative material. Housing 350 can be considerably thicker than either of electrodes 126, 128 and layer 310 providing the earbud with structure and forming a cavity within the earbud in which the various components of the earbud (e.g., a battery, charging circuitry, etc.) are disposed. Since electrodes 126, 128 are formed over the housing, one or both of the electrodes can encircle or otherwise surround the earbud components located in the cavity.

Similarly, as shown in FIG. 3D, which is a simplified cross-sectional view of a portion of insert 115, electrodes 146, 148 can be formed over a housing 360. Housing 360 can be considerably thicker than either of electrodes 146, 148 and layer 320 providing the earbud case with structure and forming one or more interior cavities within the earbud case in which various electrical components can be housed.

Electrodes 126, 128 and 146, 148 (as well as electrodes 122, 124 and 142, 144) can be formed using a variety of different techniques and in some embodiments, can be relatively thin, for example, 0.1-50 microns. In some embodiments the electrodes can be deposited directly over a surface of housings 350 and/or 360 using sputtering or electrodeposition techniques. In other embodiments each electrode can be a relatively thin metal piece that is attached to its respective housing with an appropriate adhesive and in still other embodiments, each electrode can be formed from a thin metalized mylar sheet or similar conductive material that is adhered to its respective housing. Additionally, in some embodiments one or both of dielectric layers 310 or 320 is optional. For example, in some embodiments earbud 125 (and earbud 120) do not include a thin cosmetic dielectric layer 310 and instead electrodes 126, 128 (and 122, 124) are at the exterior surface of the earbud and can, optionally, form a cosmetic surface as well. In other embodiments case 100 does not include a cosmetic overmold over electrodes 146, 148 (and 142, 144) within cavities 135 (and 130). Such embodiments can further reduce the spacing between the two adjacent electrodes that make up each capacitive pair (e.g., electrodes 126, 146 and 128, 148).

Figure 6:
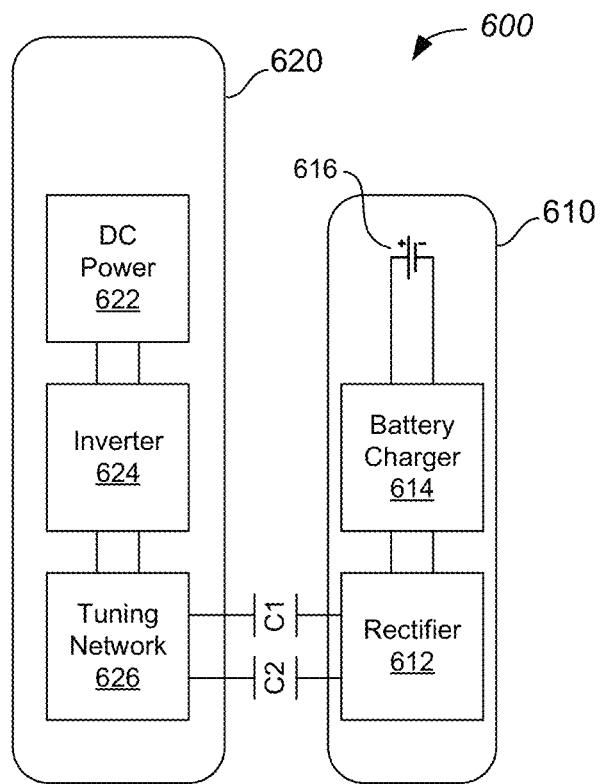
FIG. 6 is a simplified block diagram depicting various components of an earbud case according to some embodiments of the disclosure.

Reference is now made to FIG. 6, which is a simplified block diagram depicting various components of an earbud charging system 600 according to some embodiments of the disclosure. As shown in FIG. 6 charging system 600 includes an earbud 610 and an earbud case 620. Earbud 610 can be, for example, any of the earbuds described herein such as earbuds 120 or 125 as well as other suitable earbuds. Earbud case 620 can be, for example, any of the earbud cases described herein such as earbud case 100, as well as other suitable earbud cases.

While not shown in FIG. 6, earbud case 620 can include one or more cavities that are sized and shaped to receive earbud 610 such that when the earbud is within the cavity, electrodes in earbud 610 align with electrodes in earbud case 620 forming a capacitively-coupled electric circuit that enables the earbud case to charge a battery within the earbud. Thus, when earbud 610 is inserted within the receptacle cavity of earbud case 620, an electrical circuit between earbud 610 and earbud case 620 is formed within charging system 600 that includes capacitors C1 and C2 and enables power to be transferred from earbud case 620 to earbud 610. Each of capacitors C1 and C2 are formed by a pair of electrodes including a first electrode within earbud 610 and a second electrode within earbud case 620. As an example where earbud 610 is representative of earbud 125 and earbud case 620 is representative of earbud case 100, capacitor C1 can be formed from electrode 128 within the earbud and electrode 148 in the earbud case. Similarly, capacitor C2 can be formed from electrode 126 in the earbud and electrode 146 within the earbud case.

In some embodiments, capacitive charging of earbud 610 can be initiated once the earbud is inserted into the earbud case and a circuit through capacitors C1 and C2 is formed. In other embodiments charging can be delayed until a sensor (not shown) within case 620 detects that an earbud 610 is fully inserted in the cases earbud receiving cavity. Such embodiments can be particularly useful, for example, when the electrodes on the earbud and/or case are at the exterior surface of the earbud or case in order to prevent possible shorting when buds are not inserted properly. As one specific implementation example, case 620 can measure the impedance at each earbud and can turn its charging circuitry on only when the correct impedance is detected. As another implementation example, case 620 can initiate charge only when a lid of the case is closed and one or more earbuds are fully inserted within the case or when an optical sensor positioned within the cavity detects the insertion of earbud 610.

Earbud case 620 can include, among other elements, a DC power source 622, an inverter 624 and an impedance matching/tuning network 626. DC power source can be, for example, a battery within case 620 or could be a constant DC voltage received from an outside power source, such as a 5V power signal received through a receptacle connector (not shown) within case 620. DC power source 622 is coupled to inverter 624, which can be a high frequency inverter that converts the DC power signal received from power source 622 to an AC signal. In some embodiments, high frequency inverter converts the DC power signal it receives to an AC signal in the megahertz range of, for example, 2-50 MHz, and, in certain specific embodiments, high frequency inverter 624 converts the DC signal into a 5 MHz or a 6.78 MHz signal. Inverter 624 is, in turn, coupled to impedance matching/tuning network 626 that helps maximize power transferred from earbud case to the earbud over the capacitors C1 and C2.

Earbud 610 includes, among other elements, a rectifier 612, battery charging circuitry 614 and a battery 616. Rectifier 612 is coupled at an input to receive an alternating current from the capacitors and converts the AC current to a direct, DC current. Battery charging circuitry is coupled at an input to receive the DC current from rectifier 612 and coupled at an output to charge battery 616. The maximum charging power on earbud 610 can be determined by the following formula:

$$\text{Maximum Charging Power} = C \times V_{in} \times V_{max} \times 2\pi f \quad (1)$$

where C is the capacitance between the earbud and earbud case electrodes, $V_{in}$ is the RMS value of the input voltage, $V_{max}$ is the RMS value of the maximum voltage allowed across each coupling capacitor and f is the operation frequency of the high frequency inverter. The capacitance generated by capacitors C1 and C2 is inversely related to the spacing between the electrode pairs of the earbud 610 and earbud case 620. Thus, as described above, various embodiments of the invention adopt features that are intended to minimize this spacing.

Figure 7:
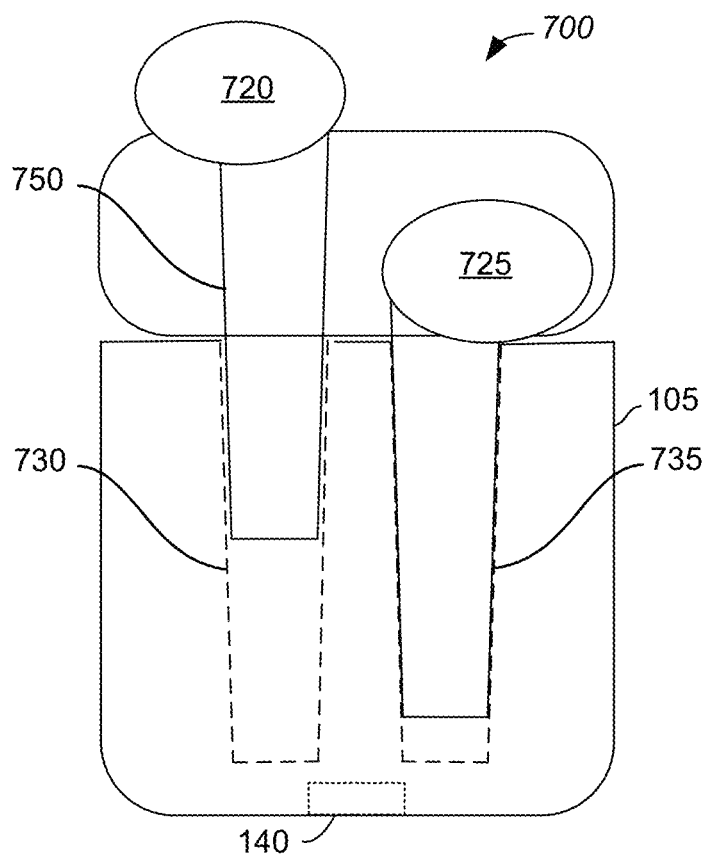
FIG. 7 illustrates a cross-sectional view of an earbud case according to some embodiments of the disclosure.

FIG. 7 depicts another embodiment that helps minimize the spacing between electrode pairs by reducing or eliminating the airgap formed between the electrode in an earbud and its corresponding electrode in the earbud case for a given electrode pair. For example, in embodiments depicted in FIGS. 1-5 above, the cavities 130, 135 within case 100 have a straight-wall cylindrical shape that is slightly larger than the straight-wall cylindrically shaped stems 150 of earbuds 120, 125. The straight walls require at least a small tolerance in the radius to ensure that the stem of each earbud 120, 125 fits within its respective cavity 130, 135. In some embodiments of the disclosure, the earbud stems and case cavities can include walls with a slight draft that enables a tighter fit between the stem and the cavity without worrying about the associated tolerances. FIG. 7 depicts such an embodiment where a case 700 includes first and second cavities 730 and 735, respectively, each of includes a slight draft (taper) in which each cavity becomes progressively narrower along its depth. Earbuds 720 and 725 can then include stems 750 that have a matching angle or draft. Thus, each earbud 720 and 725 can be fully inserted into its respective cavity 730, 735 until the side surfaces of its earbud stem 750 come into physical contact with the interior surfaces of the cavity. When manufactured to sufficiently high standards, such embodiments can results in essentially no gap 330 (or a very minimal gap at portions of stem 750 due to manufacturing variations) between each earbud stem and the interior surface of its surrounding cavity.

While FIGS. 1-5 and 7 discussed above depict embodiments of the invention in which the various electrodes are located at specific positions along the stem of the earbuds and at matching locations in the earbud case and in which the electrodes have a particular size and shape, the invention is not limited to any particular electrode configuration. In other embodiments, the electrodes can be located at different positions than those discussed above and/or have different shapes or configurations. For example, in some embodiments one or more of the electrodes can be located in the speaker housing portion of each earbud and in the lid portion of the earbud case as illustrated in FIGS. 8-10.

Figure 8:
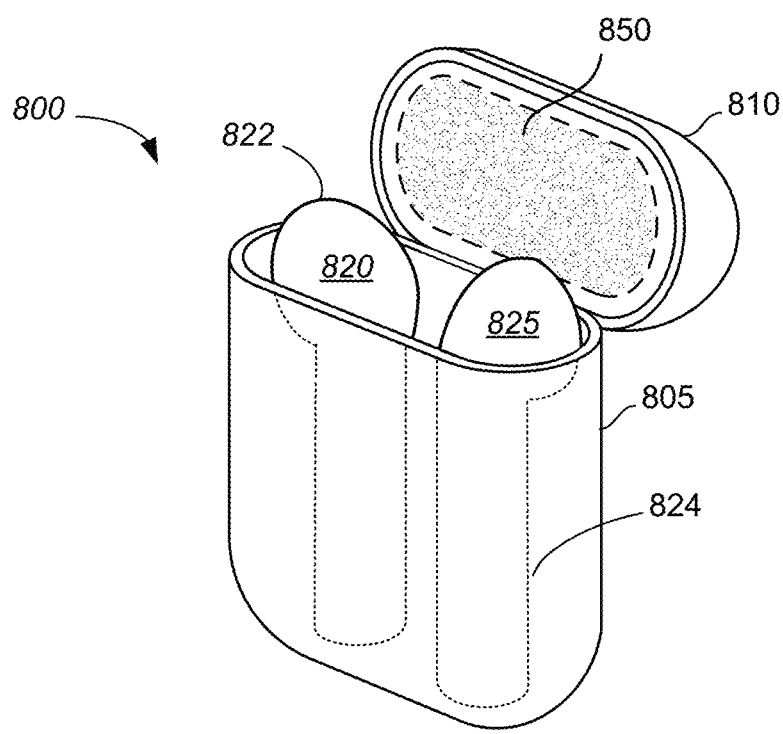
FIG. 8 illustrates a simplified perspective view of an earbud case according to some embodiments of the disclosure.
Figure 9:
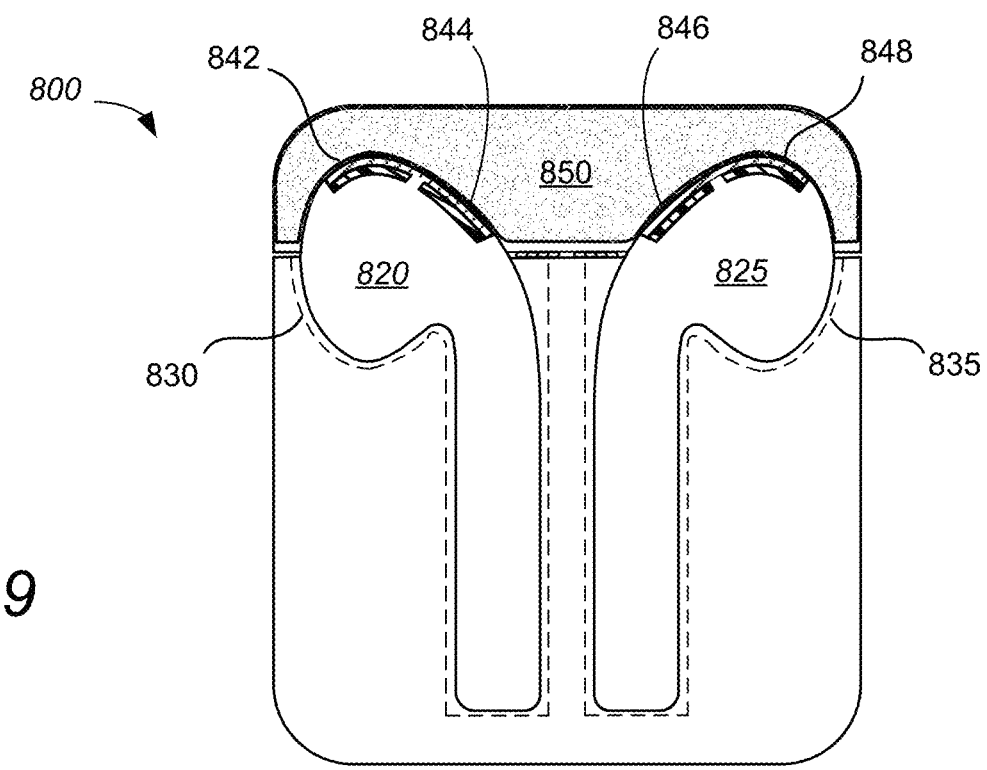
FIG. 9 is a simplified cross-sectional view of the earbud case shown in FIG. 8.

FIG. 8 illustrates a simplified perspective view of an earbud case 800 according to some embodiments of the disclosure that includes electrodes in the case lid. As shown in FIG. 8, case 800 includes a primary housing 805 and a lid 810 that can be pivotably coupled to housing 805 by a hinge (not labeled). Housing 805 can include interior space in which a pair of earbuds 820, 825 can be stored. Each of electrodes 820, 825 can include a speaker housing 822 and a stem 824. In some embodiments a speaker and audio port are housed and formed in speaker housing 822 while battery charging circuitry, a battery, a wireless antenna and other components are housed within stem 824.

Figure 10A:
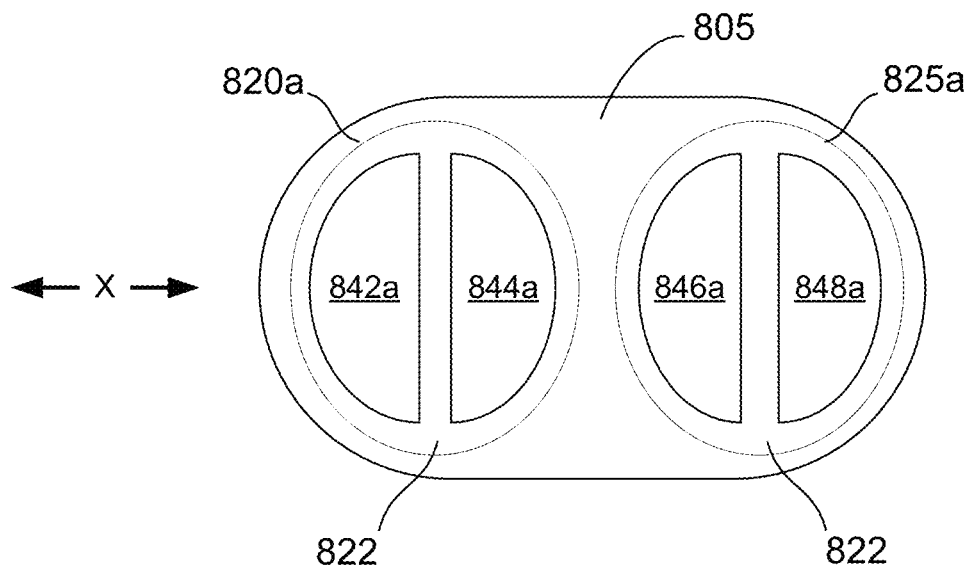
FIG. 10A is a simplified top view of a pair of earbuds according to some embodiments of the disclosure.
Figure 10B:
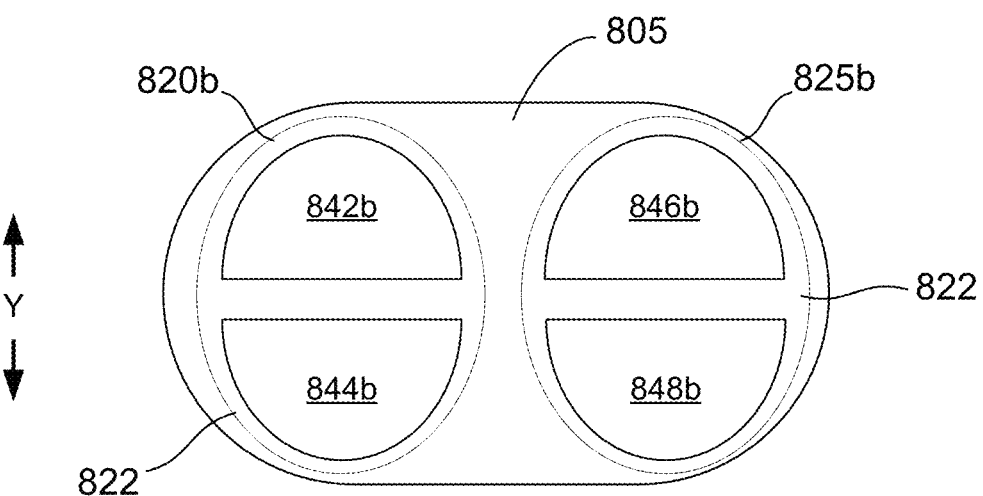
FIG. 10B is a simplified top view of a pair of earbuds according to some embodiments of the disclosure.

Instead of having electrodes within the stem of earbuds 820, 825, each earbud 820, 825 can include a pair of electrodes within speaker housing portion 822. For example, as shown in FIG. 9, which is a simplified cross-sectional view of the earbud case shown in FIG. 8, earbud 820 can include a pair of electrodes 842, 844 and earbud 825 can include a pair of electrodes 846, 848. Each of the electrodes 842, 844, 846 and 848 can be covered by a thin dielectric skin (not labeled) as described with respect to FIGS. 3A-3D. Electrodes 842-448 can be arranged in any suitable manner. As one example, electrodes 842a, 844a and 846a, 848a can be arranged opposite each other along a direction X of the earbud speaker housing 822 as shown in FIG. 10A, which is a simplified top view of a pair of earbuds 820a, 825a according to some embodiments of the disclosure positioned within cavities formed within earbud housing 805. As another example, electrodes 842b, 844b and 846b, 848b can be arranged opposite each other along a direction Y of the earbud speaker housing 822 as shown in FIG. 10B, which is a simplified top view of a pair of earbuds 820b, 825b according to some embodiments of the disclosure positioned within cavities formed within earbud housing 805. Embodiments of the disclosure are not limited to any particular arrangement of the electrodes, however, and other arrangements are possible.

Referring back to FIGS. 8 and 9, earbud case 800 can include earbud receiving cavities 830 and 835 to receive earbuds 820, 825, respectively, and can further include multiple electrodes within a conformable region 850 of lid 810. Conformable region 850 can be made from an electrically conductive, relatively soft compliant material that conforms in shape to an upper surface of earbuds 820, 825 when the lid is closed and the earbuds are in the receiving cavities 830, 835. The conformable nature of region 850 enables the region to match the shape of complex surfaces, such as an upper curved surface of an earbud. Thus, once lid 810 is closed covering earbuds 820, 825 within case 800, conformable region 850 conforms to and is in direct contact with the upper surface of earbuds 820, 825 with essentially no airgap between region 850 and electrodes 842-848 (as shown in FIG. 9) enabling highly efficient transfer of power between electrodes 842-848 and electrodes within region 850.

In some embodiments conformable region 850 can be a singular region made from an electrically conductive material having anisotropic conductivity that conducts current in a single direction. For example, conformable region 850 can be a flexible polymer material having graphite tubes or particles embedded within in material in a pattern that forces current through the material along a particular axis or direction (e.g., from the surface of region 850 to an electrical connection within the lid leads to impedance matching/tuning network 626 of FIG. 6). The anisotropic nature of conformable region 850 prevents current from leaking in a lateral direction that could otherwise short adjacent electrodes in an earbud together and does not require an insulative layer formed over region 850. Thus, in effect, the anisotropic nature of the conductive material in region 850 enables the formation of separate charging circuits for each earbud. That is, portions of conformable region 850 adjacent to electrodes 842, 844 form first and second electrodes within region 850 that, when operatively coupled to electrodes 842, 844 create capacitors C1 and C2 for earbud 820 as described with respect to FIG. 6 for a first charging circuit. Similarly, portions of conformable region 850 adjacent to electrodes 846, 848 form third and fourth electrodes within region 850 that, when operatively coupled to electrodes 846, 848 create capacitors C1 and C2 for earbud 825 as described with respect to FIG. 6 for a second charging circuit.

Figure 11A:
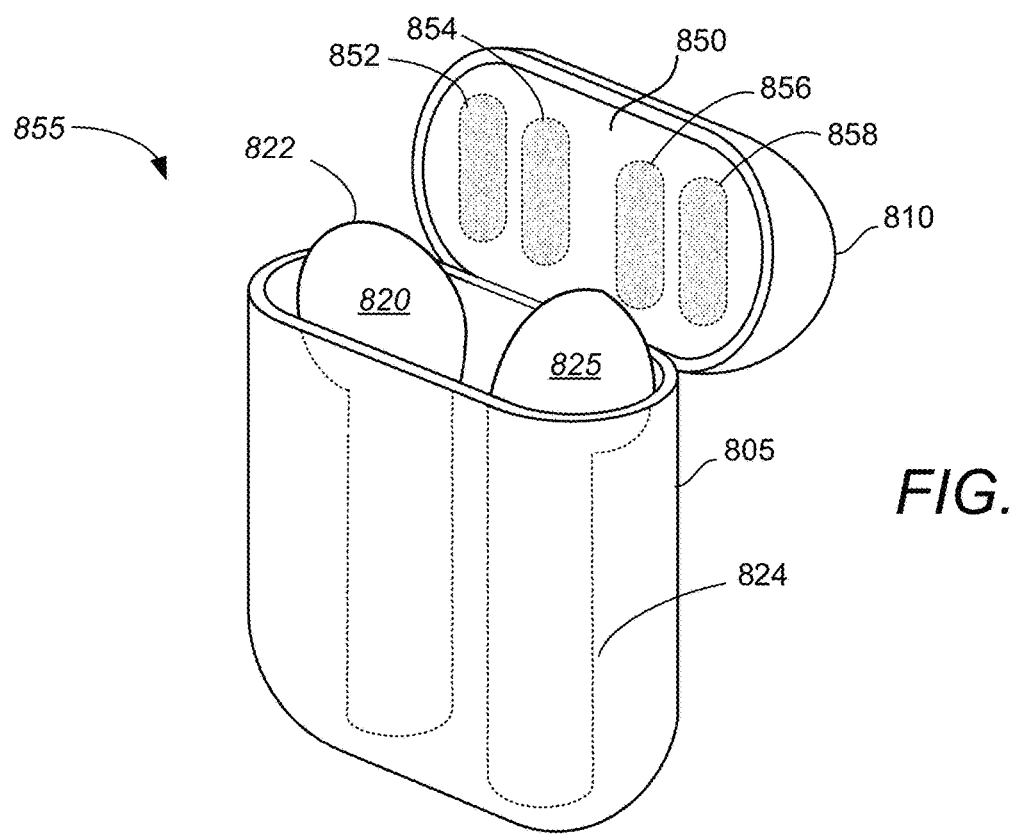
FIG. 11A illustrates a simplified perspective view of an earbud case according to some embodiments of the disclosure.

In some embodiments, instead of a single, large conformable region 850, multiple distinct conformable electrodes can be formed within lid 810 that are aligned with electrodes in the earbuds that are intended to be stored in the case. For example, in some embodiments where earbuds 820, 825 include electrodes located at positions depicted in FIG. 10A, a case for a pair of earbuds can include multiple conformable electrodes spaced apart along a width of lid 810. Such an embodiment is as shown in FIG. 11A where earbud case 855 includes conformable electrodes 852, 854 that aligned with electrodes 842a, 844a of earbud 820a as shown in FIG. 10A. Case 855 can also include conformable electrodes 856, 858 that are aligned with electrodes 846a, 848a in earbud 825a. In some embodiments, lid 810 can include a contoured inner surface that faces the earbuds when the lid is in the closed position and generally matches the shape of the earbuds without coming in contact with the earbuds. Conformable regions 852-858 are electrically separated from each other by the inner surface and can be located at locations along the contoured inner surface that align with the electrodes of the earbuds and come in contact with the earbuds when the lid is in the closed position. Because the electrodes in the case in these embodiments are separated from each other, the conformable material does not need to have anisotropic conductivity and each of the electrodes 852-858 can be made from a flexible conductive material, such as the material used in GORE® SMT EMI gaskets as well as other suitable materials.

Figure 11B:
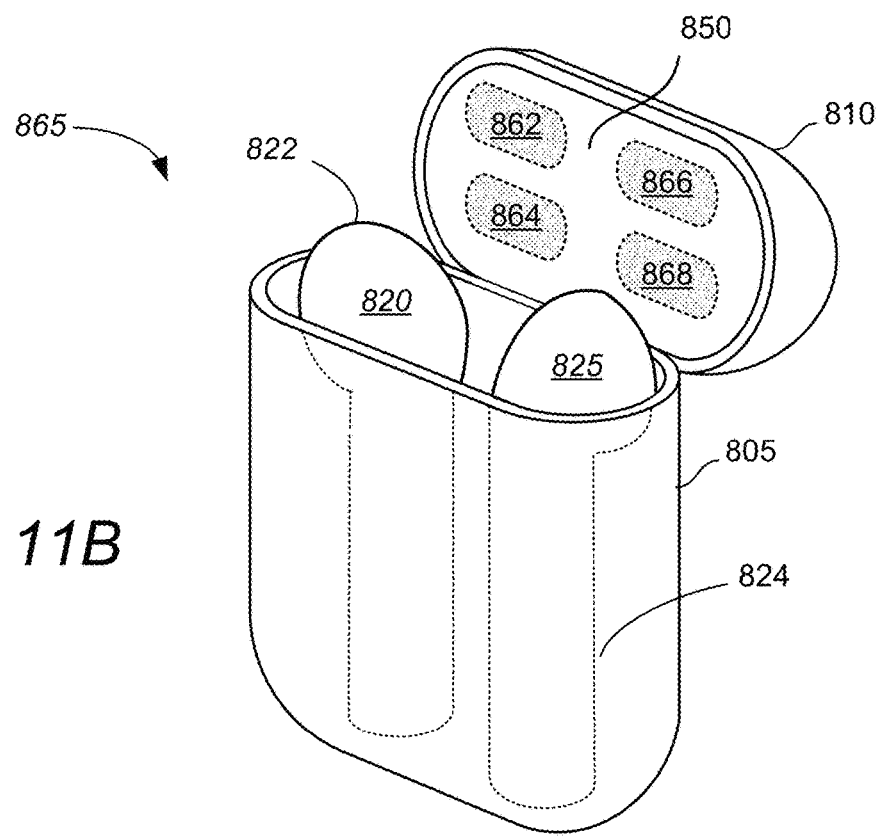
FIG. 11B illustrates a simplified perspective view of an earbud case according to some embodiments of the disclosure.
Figure 12:
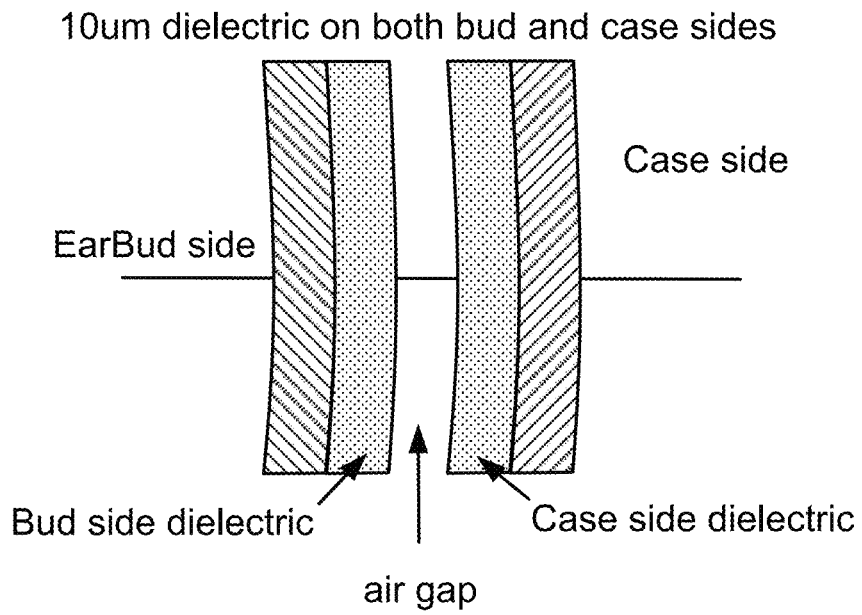
FIGS. 12-15 illustrate experimental results according to some embodiments of the disclosure.
Figure 13:
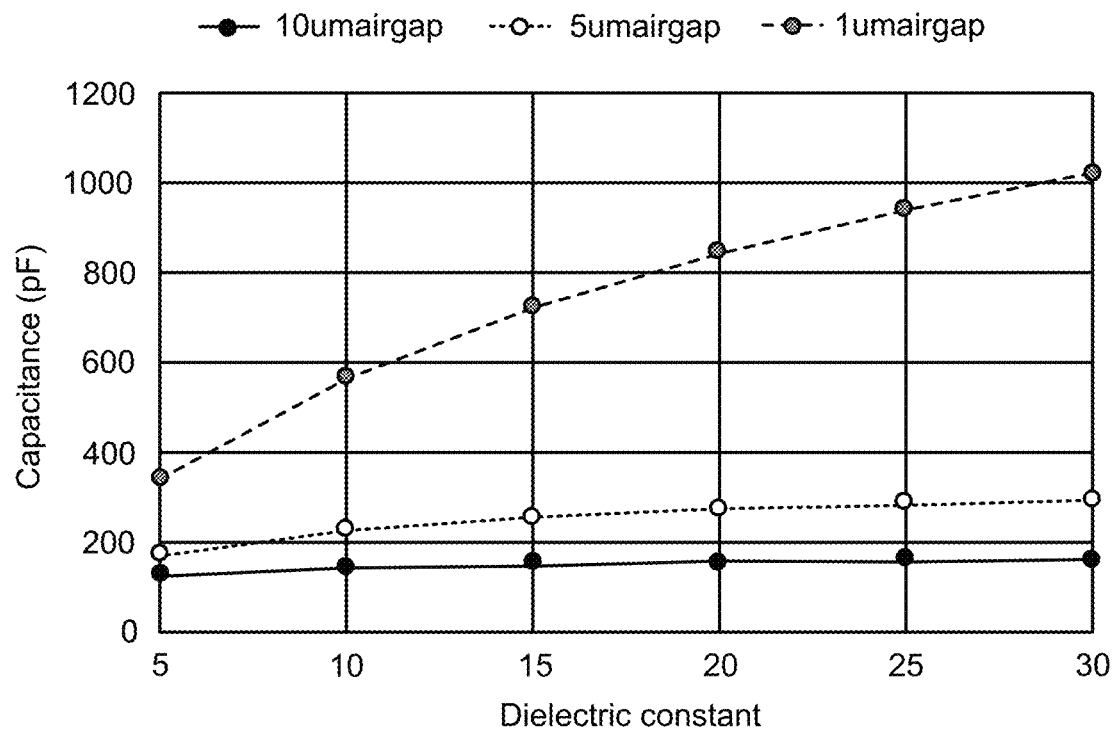

As another example, a case for a pair of earbuds can include multiple conformable regions spaced apart along a depth of lid 810. Such an embodiment is as shown in FIG. 11B where earbud case 865 includes conformable electrodes 862, 864 that align with electrodes 842b, 844b of earbud 820b as shown in FIG. 10B. Case 865 can also include conformable electrodes 856, 858 that are aligned with electrodes 846b, 848b in earbud 825b.

To demonstrate the effectiveness of various embodiments of the invention, the inventors performed a number of simulations using finite element analysis (FEA) software from Ansys Maxwell. FIGS. 12-17 illustrate results of the simulations. In a first series of simulations depicted in FIGS. 12 and 13, capacitance was calculated based on an earbud case and earbud design in accordance with embodiments described with respect to FIGS. 1-5 in which the earbud and earbud case each had a thin (10 micron) cosmetic dielectric layer formed over the bud side and case side electrodes. The simulations varied the dielectric constant of the dielectric from a k value of 5 to 30 over each of three different airgap sizes (1 micron, 5 microns and 10 microns).

Figure 14:
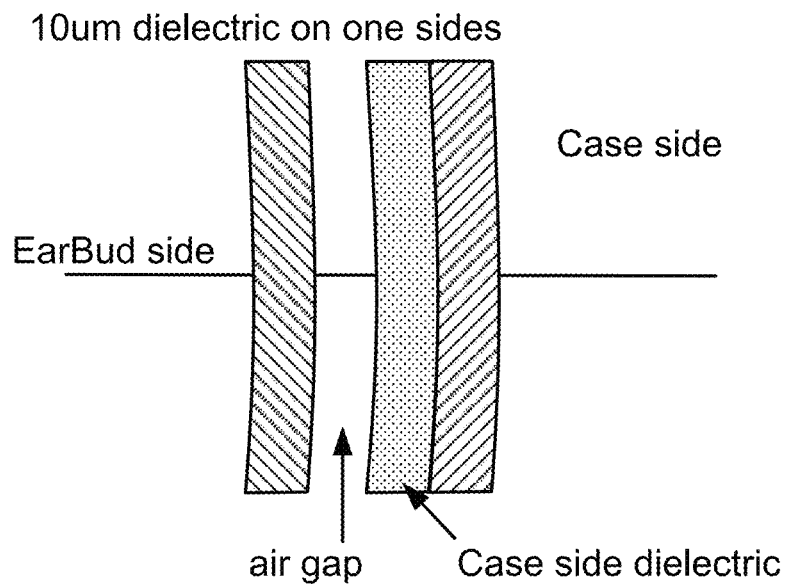
Figure 15:
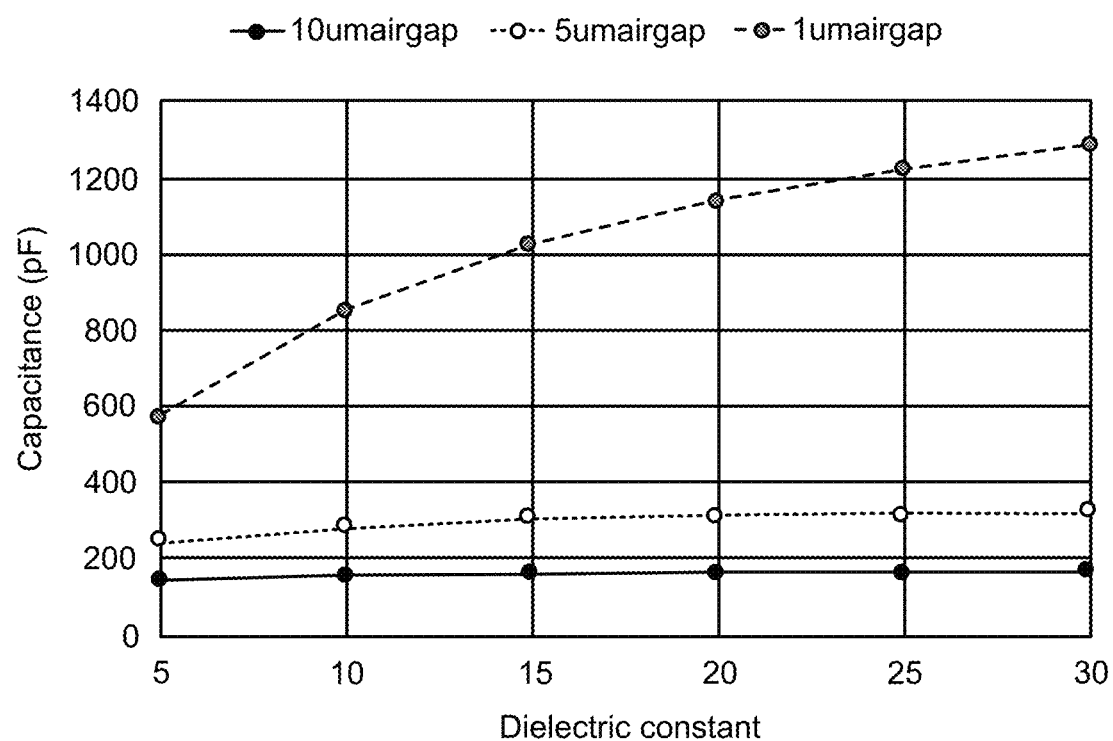

In a second series of simulations depicted in FIGS. 14 and 15, capacitance was calculated based on an earbud case and earbud design in accordance with embodiments described with respect to FIGS. 1-5 in which the earbud case each had a thin (10 micron) cosmetic dielectric layer formed over the earbud case dielectric and the earbud did not include a cosmetic dielectric layer covering the bud side electrodes. As with the simulations set forth in FIGS. 12 and 13, the FIGS. 14 and 15 simulations also varied the dielectric constant of the dielectric from a k value of 5 to 30 over each of three different airgap sizes (1 micron, 5 microns and 10 microns).

Based on the results of the simulations depicted in FIGS. 12-15, the inventors have shown that higher dielectric material helps to increase the capacitance between the earbud electrodes and earbud case electrodes. Reducing the size of the airgap is even more effective at increasing capacitance, however. Larger capacitance between the electrodes can enable sufficient charging power with an acceptable level of inverter voltage, operation frequency and voltage between the electrodes.

Figure 16:
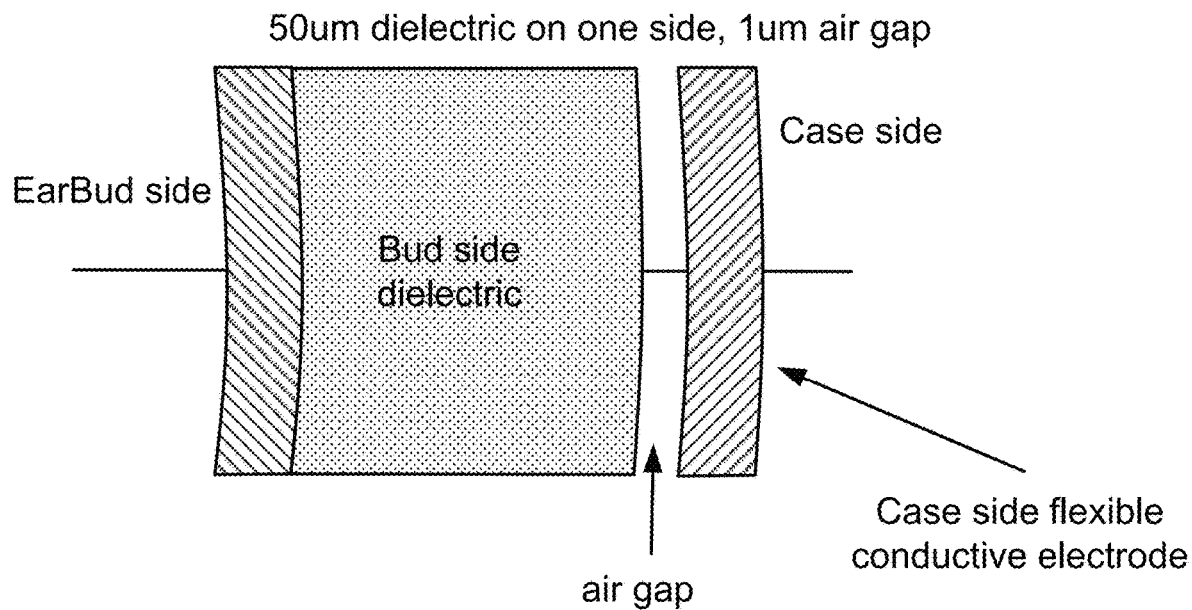
FIGS. 16-17 illustrate experimental results according to some embodiments of the disclosure.
Figure 17:
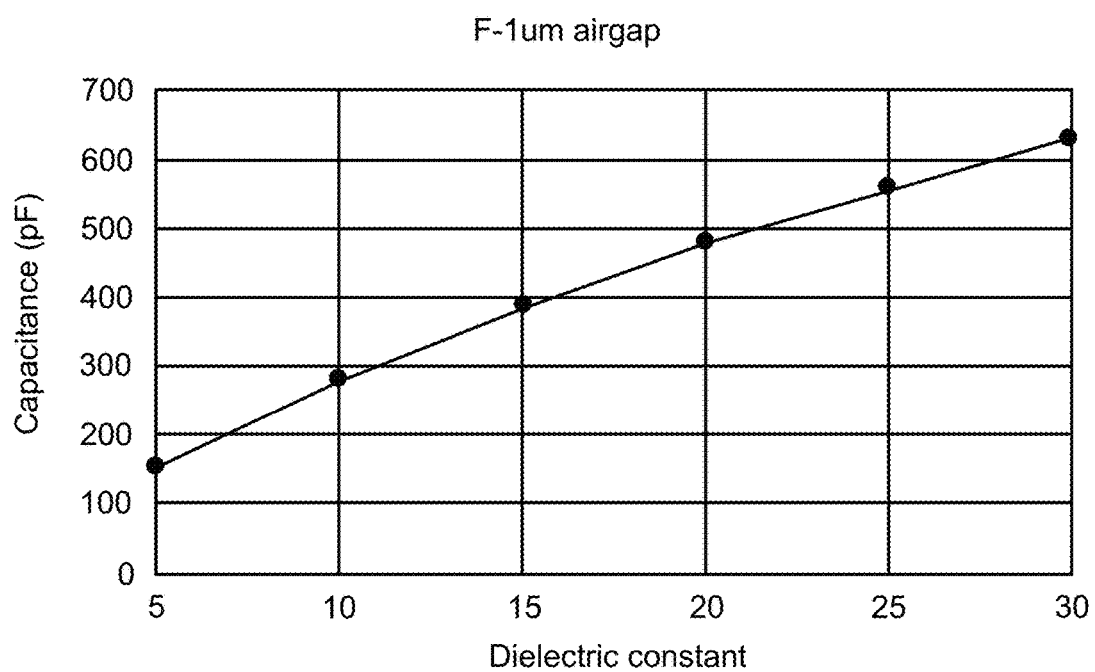

FIGS. 16 and 17 depict the results of additional simulations where capacitance was calculated based on an earbud case and earbud design in accordance with embodiments described with respect to FIGS. 8 and 9. In the FIGS. 16 and 17 simulations, a 50 micron dielectric layer was modeled over the earbud electrodes and the earbud case included a flexible conductive materials as the conformable electrode in the lid earbud case. Since the conformable electrode is generally in physical contact with the earbuds, a 1 micron airgap was used in the simulation and the simulations varied the dielectric constant of the dielectric from a k value of 5 to 30. Each of the simulations depicted in FIGS. 12-17 demonstrate that embodiments of the invention can generate sufficient capacitance between the electrodes to sufficiently charge batteries in the earbuds using the techniques described herein. A person of skill in the art will recognize that tradeoffs can be made at the design states between the various variables that impact charging power to ensure safe voltage levels during operation, system efficiency and adequate thermal performance during operation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

For example, while the various examples set forth in the disclosure above focused on cases for a pair of earbuds and on various earbud designs, embodiments of the invention are not limited to only earbuds and can be used for other types of portable listening devices. Additionally, while the specific examples of earbuds (and corresponding earbud cases) presented above according to embodiments of the disclosure either included two electrodes in the stem of the earbud or two electrodes in the speaker housing of the earbud, embodiments of the invention are not limited to such. In other embodiments, a first electrode can be formed in the stem of an earbud while a second electrode can be formed in the speaker housing. Additionally, some embodiments can include just a single capacitive electrode and complete an electrical charging circuit, such as the circuit shown in FIG. 6, with an electrical contact, such as a copper or other appropriate metal or plated contact. For example, in some embodiments an earbud can include a single contact at the bottom of stem 150 and an electrode either within the stem or within the speaker housing. In all such embodiments, the earbud case can include electrodes and/or contacts at locations that align with the electrodes and/or contacts of the earbuds as appropriate to enable charging.

In still other embodiments, components of an earbud can be arranged differently than described in the examples above and/or the earbuds can include fewer or more components. For example, while earbuds described above included a battery in a stem portion of the earbud, in other embodiments a battery can be formed in the speaker housing portion. And, in some embodiments, the earbuds may not include a stem at all. As another example, in some embodiments earbuds according to the present disclosure can include deformable earbud tips that enable the earbud to better fit in a user's ear. In still other examples, earbuds according to the disclosure can include a touch interface at an external surface of the housing.

Additionally, while the various embodiments and examples described above were primarily focused on an earbud case for storing earbuds, embodiments of the disclosure are not limited to such and the techniques of the disclosure described above are equally applicable to other portable electronic devices including wearable devices, smart phones, and tablet computers among others. Also, other embodiments of the disclosure are applicable to cases for other types of in-ear listening devices. For example, in one embodiment, case 100 described in FIG. 1 can be a case for a single in-ear listening device instead of a pair of earbuds. In such an embodiment, a single cavity can formed within housing 105 that is sized and shaped to hold the in-ear listening device. Similarly, in other embodiments, case 100 can be sized and shaped to hold other types of portable listening devices besides earbuds including hearing aids, headphones and the like. For example, in some embodiments a case for a portable listening device is provided. The case can include a housing having a cavity formed within the housing and configured to receive the portable listening device; a lid attached to the housing and operable between a closed position where the lid is aligned over the cavity and an open position where cavity is exposed enabling the portable listening device to be removed from the housing; a pair of electrodes positioned within the housing adjacent to the first cavity; and charging circuitry coupled to the pair of electrodes to charge a battery of the portable listening device when the portable listening device is received within the cavity. The charging circuitry can include a high frequency inverter coupled to receive a DC power signal and output a high frequency AC signal to the pair of electrodes. These embodiments, others and their equivalents are possible in view of the teaching of the present disclosure.

What is claimed is:

1. A case for a portable listening device, the case comprising:
    a housing having a cavity formed within the housing and configured to receive the portable listening device, wherein the cavity has a tubular section that extends from an upper surface of the housing towards a bottom surface of the housing;
    a lid attached to the housing and operable between a closed position where the lid is aligned over the cavity and an open position where cavity is exposed enabling the portable listening device to be removed from the housing;
    a pair of electrodes positioned within the housing adjacent to the cavity, wherein each electrode in the pair of electrodes encircles a cross-section of the tubular section; and
    charging circuitry coupled to the pair of electrodes, the charging circuitry including a high frequency inverter coupled to receive a DC power signal and configured to output a high frequency AC signal to the pair of electrodes to wirelessly charge a battery of the portable listening device when the portable listening device is received within the cavity.

2. The case for a portable listening device set forth in claim 1 wherein the pair of electrodes include a first electrode and a second electrode each of which has a substantially similar shape and wherein the first electrode is spaced apart from and positioned above the second electrode.

3. The case for a portable listening device set forth in claim 1 wherein the housing comprising an outer shell and insert bonded to the outer shell and wherein the cavity is defined by a surface of the insert.

4. The case for a portable listening device set forth in claim 3 wherein the insert includes an upper indentation sized and shaped to receive a speaker portion of the portable listening device and an interior tube sized and shaped to receive a stem of the portable listening device.

5. The case for a portable listening device set forth in claim 1 wherein:
    the portable listening device is a pair of earbuds and the housing includes first and second cavities formed within the housing, the first cavity configured to receive a first earbud in the pair of earbuds and the second cavity configured to receive a second earbud in the pair of earbuds;
    the pair of electrodes is a first pair of electrodes, the cavity is a first cavity, and the case further comprises a second pair of electrodes positioned within the housing adjacent to the second cavity; and
    the charging circuitry is coupled to and configured to output a high frequency AC signal to each of the first and second pairs of electrodes.

6. A case for a pair of earbuds, the case comprising:
    a housing having first and second cavities formed within the housing, the first cavity configured to receive a first earbud in the pair of earbuds and the second cavity configured to receive a second earbud in the pair of earbuds;
    a lid attached to the housing and operable between a closed position where the lid is aligned over the first and second cavities and an open position where first and second cavities are exposed enabling the pair of earbuds to be removed from the housing;
    a first pair of electrodes positioned within the housing adjacent to the first cavity;
    a second pair of electrodes positioned within the housing adjacent to the second cavity; and
    charging circuitry coupled to the first and second pairs of electrodes, the charging circuitry including a high frequency inverter configured to receive a DC power signal and output a high frequency AC signal to each of the first and second pairs of electrodes; wherein:
    the first cavity includes a first tubular section defined by an interior surface of the housing and the second cavity includes a second tubular section defined by an interior surface of the housing;
    the first pair of electrodes includes a first electrode surrounding a first portion of the first tubular section and a second electrode, spaced apart from the first electrode and surrounding a second portion of the first tubular section; and
    the second pair of electrodes includes a third electrode surrounding a first portion of the second tubular section and a fourth electrode, spaced apart from the third electrode and surrounding a second portion of the second tubular section.

7. The case for a pair of earbuds set forth in claim 6 wherein each of the first and second cavities includes a constant taper such that an upper portion of each cavity has a larger cross-sectional opening than a bottom portion of each cavity.

8. The case for a pair of earbuds set forth in claim 6 wherein the first and second tubular sections each have a circular cross-section and the first, second, third, and fourth electrodes each have a circular cross-section.

9. The case for a pair of earbuds set forth in claim 6 wherein the first and second tubular sections each have a non-circular cross-section and the first and second electrodes and the third and fourth electrodes each have a substantially similar cross-sectional shape that is slightly larger than that of the first and second tubular sections, respectively.

10. The case for a pair of earbuds set forth in claim 6 wherein the high frequency inverter is configured to generate an AC signal between 2-50 MHz.

11. The case for a pair of earbuds set forth in claim 6 wherein each of the first, second, third and fourth electrodes is between 0.1 to 50 microns thick.

12. The case for a pair of earbuds set forth in claim 11 wherein the housing includes a thin dielectric skin formed within the first and second tubular sections covering the first and second pairs of electrodes.

13. The case for a pair of earbuds set forth in claim 12 wherein the dielectric skin is between 5-25 microns thick.

14. A case for a pair of earbuds including a first earbud having a first pair of electrodes and a second earbud having a second pair of electrodes, the case comprising:
a housing having first and second cavities formed within the housing, the first cavity configured to receive the first earbud in the pair of earbuds and the second cavity configured to receive the second earbud in the pair of earbuds;
a lid attached to the housing and operable between a closed position where the lid is aligned over the first and second cavities and an open position where first and second cavities are exposed enabling the pair of earbuds to be removed from the housing, the lid including an electrically conductive and compliant region facing the first and second cavities when the lid is in the closed position; and
charging circuitry coupled to the electrically conductive and compliant region, the charging circuitry including a high frequency inverter configured to receive a DC power signal and output a high frequency AC signal to each of the first and second pairs of electrodes.

15. The case for a pair of earbuds set forth in claim 14 wherein the electrically conductive and compliant region extends within the lid across a region that covers both the first and second cavities and comprises a material that has anisotropic conductivity.

16. The case for a pair of earbuds set forth in claim 14 wherein the electrically conductive and compliant region includes a plurality of electrically isolated regions, the plurality of electrically isolated regions including a first pair of electrically conductive and compliant regions spaced apart from the first cavity and a second pair of electrically conductive and compliant regions spaced apart from the second cavity.

17. The case for a pair of earbuds set forth in claim 14 wherein the first cavity includes a first tubular section configured to accept a stem section of a first earbud and the second cavity includes a second tubular section configured to accept a stem section of a second earbud.

* * * * *